United States Patent [19]
MacManus

[11] 3,758,080
[45] Sept. 11, 1973

[54] MACHINE FOR PRODUCING AERATED PRODUCTS

[76] Inventor: John MacManus, 143-16-22nd Rd., Whitestone, N.Y. 11357

[22] Filed: Apr. 26, 1972

[21] Appl. No.: 247,575

Related U.S. Application Data

[60] Continuation-in-part of Ser. No. 837,087, June 27, 1969, Pat. No. 3,713,841, which is a continuation of Ser. No. 571,885, Aug. 11, 1966, abandoned, and a continuation-in-part of Ser. No. 154,431, June 18, 1971, Pat. No. 3,700,214, which is a division of Ser. No. 883,867, Dec. 10, 1969, Pat. No. 3,606,266.

[30] Foreign Application Priority Data

| Dec. 31, 1968 | Great Britain | 61,986/68 |
| Feb. 13, 1969 | Great Britain | 7,982/69 |
| Sept. 5, 1969 | Great Britain | 44,032/69 |
| Apr. 29, 1971 | Great Britain | 12,000/71 |

[52] U.S. Cl.................. 259/4, 261/75, 261/140
[51] Int. Cl........................................... B01f 15/02
[58] Field of Search ............ 259/4, 18, 36, 95, 259/147, 151; 261/140, 75; 99/134 A, 134 R, 60

[56] References Cited
UNITED STATES PATENTS

| 2,967,700 | 1/1961 | Lee | 261/140 R |
| 3,203,371 | 8/1965 | Mosey | 261/75 |
| 3,402,562 | 9/1968 | Menzel | 261/140 R |

Primary Examiner—Robert W. Jenkins
Attorney—Robert Muir

[57] ABSTRACT

The machine includes a motor-driven pump having an inlet operatively connected both to an air intake and to an unpressurized liquid product container, whereby the liquid product and air are simultaneously drawn into the pump. An adjustable needle valve assembly is provided at the air intake to control flow of air into a chamber which has a check valve at its outlet. The assembly includes a two-piece plug which has an air filter positioned between the two pieces. The pump outlet is connected to a static, narrow-orifice homogenizer which emulsifies the liquid and air mixture. A solenoid-operated valve is located at the outlet of the homogenizer and an electrical control system simultaneously opens the valve and starts the motor.

13 Claims, 2 Drawing Figures

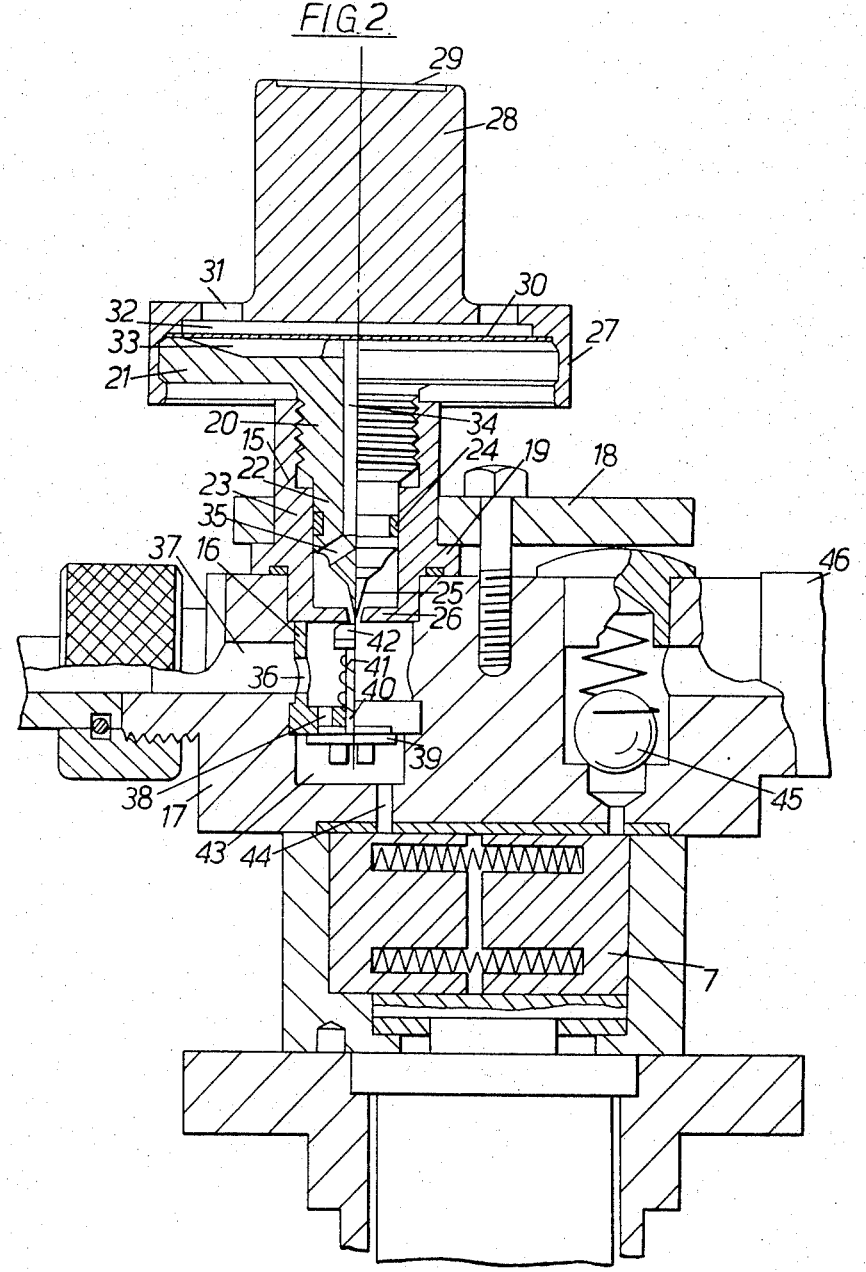

MACHINE FOR PRODUCING AERATED PRODUCTS

This application is a continuation-in-part of application Ser. No. 837,087, filed June 27, 1969, now U.S. Pat. No. 3,713,841 which was a continuation of application Ser. No. 571,885, filed Aug. 11, 1966, and now abandoned; and a continuation-in-part of application Ser. No. 154,431, filed June 18, 1971, now U.S. Pat. No. 3,700,214 which, in turn, was a division of application Ser. No. 883,867, filed on Dec. 10, 1969, and now U.S. Pat. No. 3,606,266.

British Pat. No. 1,250,497 describes a machine for producing whipped cream or other stiff fluent aerated food products, the machine being of the kind comprising a motor driven pump which has an inlet connected both to an air suction intake and through a suction tube to an unpressurised liquid product container whereby in use liquid product and air are simultaneously drawn into the pump, the pump having an outlet connected to a product discharge outlet through a flow path which incorporates a static homogeniser for emulsifying the mixture. The air suction intake incorporates valve means for controlling the in flow of air through a valve chamber, the valve means including a member which has a resiliently urged closed position and which is opened by pump suction to allow air to be sucked in; and the valve means also includes an externally adjustable portion to vary the amount of air sucked in. The adjustable portion includes a needle valve which is adjustable by screwing an externally accessible plug into or out of the valve chamber. Such a machine is hereinafter referred to as of the kind described.

The fine adjustment of the air which is sucked into the pump, along with the liquid product, is very essential to provide an accurate control over the stiffness of the emulsified product and also to take account of different butter fat contents and other characteristics of the liquid product.

In the particular example described in the earlier application, unwanted air was prevented from entering the valve chamber through any clearance between the mating screw threads of the plug and valve chamber by virtue of an O-sealing ring which was positioned at the upstream end of the screw threads and was compressed between the plug and the valve chamber to an extent depending upon the position of angular adjustment of the plug. This was not entirely satisfactory in that the desirable range of angular adjustment of the plug is greater than the maximum desirable corresponding range of compression of the sealing ring for efficient operation without undue wear of the sealing ring. Also, since the mating screw threads are downstream, as far as the direction of air suction is concerned, there is a danger that product spitting in the valve chamber may enter between the mating screw threads, leading to extra trouble each time the parts are stripped down for washing.

Another difficulty experienced with the particular plugs described in the earlier application was that of filtering the air being sucked in. Previous proposals in this direction involved a tubular shroud surrounding an external part of the plug formed in its wall with air inlet ports. This shroud was not easy to fit and was always liable to be displaced or dirtied by the fingers of the operator manipulating a knurled end piece of the plug during adjustment.

In accordance with the present invention, in a machine of the kind described the plug has a screw threaded body part which screws into the valve chamber and, at its leading end, a nose carrying the movable part of the needle valve and formed with a cylindrical peripheral wall which is received in a cylindrical part of the valve chamber with an O-sealing ring mounted in an annular groove in the peripheral wall.

With this arrangement the O-sealing ring provides the seal between the plug and valve chamber downstream of the mating screw threads and the compression of the sealing ring is at all times constant.

If the plug nose carries the needle part of the needle valve, an air passage will be formed from atmosphere through the body and nose of the plug to an outlet port or ports downstream of the sealing ring laterally of the needle. Alternatively, if the plug nose carries the seating part of the needle valve, as illustrated in the earlier application, the air inlet passageway through the plug will terminate in the centre of the seating.

Preferably the member of the valve means which has a resiliently urged closed position and which is opened by pump suction to allow air to be sucked in includes a stem extending through an apertured part of the valve chamber wall and carrying a disc which is resiliently urged by means of a spring surrounding the stem into engagement with the wall to close the apertured part, downstream of the needle valve, similarly to the construction illustrated in the earlier Specification. The disc will then be drawn away from the apertured part when the pump starts to allow air or air and cream to be drawn into the pump. When the pump stops the disc will immediately close the apertured part under the bias of the spring producing sharp cut off and avoiding the discharge of unwhipped product from the machine outlet at the beginning of the discharge of a portion of whipped product. The stem may carry a valve part which cooperates with part of the needle valve to prevent back flow of the cream through the needle valve, when the pump is not operating, upstream of the apertured part. Preferably such valve part comprises a further disc which closes the needle valve seating from the side remote from that from which the seating is approached by the movable needle.

In accordance with a further independent feature of the invention, the plug of a machine of the kind described has a body part formed in two pieces which trap between them a filter disc, a first piece being formed with an air inlet from the atmosphere leading to one side of the filter disc and the second piece being formed with an air passageway leading from the other side of the filter disc to the needle valve.

In this way the filter disc is protected and supported inside the plug body and may be made cheaply from a thin sheet material.

The two pieces of the body part may be screwed together but are preferably a snap fit, the second piece being made of stainless steel and the first piece being a moulding of plastics material. The moulded piece may then carry a scale for setting the rotary adjustment of the plug and the boss or other manually manipulable part for rotation of the plug.

One example of a machine constructed in accordance with the present invention is illustrated in the accompanying drawings, in which:

FIG. 2 is a vertical section through the air inlet control plug and associated parts.

Figure 1:
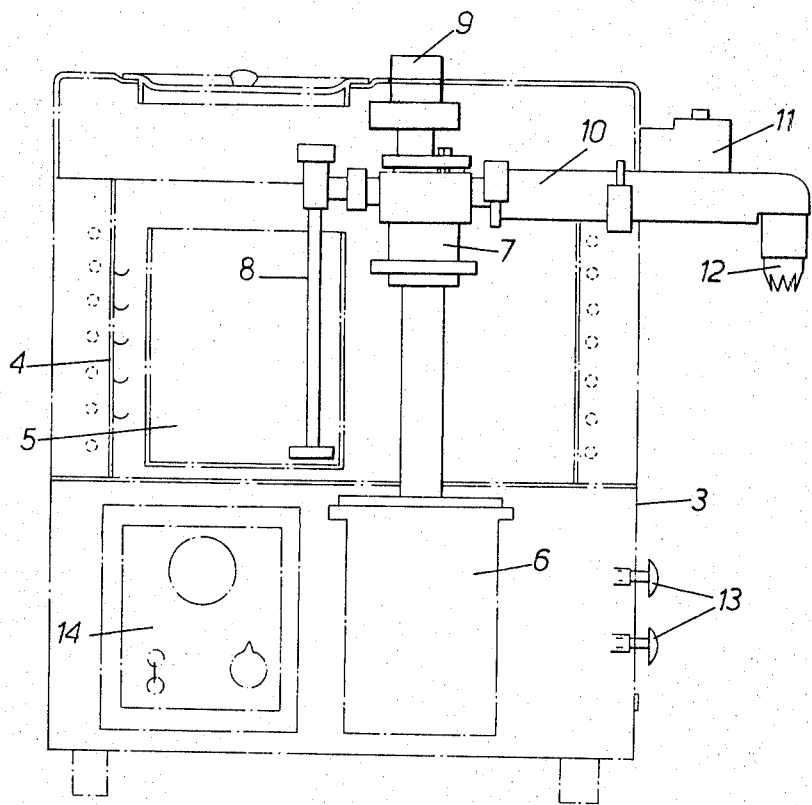
FIG. 1 is a side elevation of the machine.

The illustrated machine is identical to that illustrated in my Specification No. 1,250,497 except for the parts illustrated in FIG. 2 of the accompanying drawings. The air chamber and plug incorporated in FIG. 2 of the accompanying drawings is identical to that shown in the drawings accompanying the provisional specification although it is seen as from the other side of the same section line.

As will be apparent by reading the parent specification, the machine has a casing 3 having a refrigerated compartment 4 in which sits an unpressurised liquid product container 5. An electric motor 6 drives a vane pump 7 which simultaneously draws in liquid product from the container 5 through a suction pipe 8, and air through an air inlet plug 9. The pump 7 discharges the mixture of liquid product and air through a spring loaded non-return valve into one end of a homogeniser 10 which whips the product. The product is discharged through a solenoid operated valve 11 to an outlet nozzle 12 or to a hose attached to the outlet in place of the nozzle if desired. The motor 6 and valve 11 are controlled by controls 13 and 14.

As shown in FIG. 2 the machine has a valve chamber formed by housing parts 15 and 16 which are made of stainless steel and are mounted in a valve block 17 by means of an overlying bolted plate 18 which holds a flange 19 down on the block 17 to compress an interposed sealing ring between them.

The plug comprises a body part incorporating a threaded portion 20 and a flange 21 and formed integrally with a projecting nose 22. The nose is received within a complementary cylindrical portion 23 of the housing part 15 and carries an O-sealing ring 24 mounted in an annular groove in the nose and rubbing over the cylindrical wall of the portion 23. At its forward end the nose 22 carries a needle 25 of a needle valve the seating of which is formed in a base wall 26 of the housing part 15.

The flange 21 has snapped over it a skirt 27 of a moulded plastics piece incorporating a boss 28 marked with indicia 29. A filter disc 30 is trapped between the moulded plastics piece and the flange 21. A ring of air inlet ports 31 open through the moulded piece into a flat chamber 32 bounded by one face of the filter disc 30. A space 33 bounded by the other face of the filter disc 30 and by the flange 21 leads through a central passageway 34 in the plug to one or more ports 35 formed in the forward end of the nose to the side of the needle 25 downstream of the sealing ring 10.

The housing part 16 is formed with a ring of ports 36 which interconnect the liquid product suction duct 37, and hence the suction pipe 8 with the interior of the part 16. The bottom wall of the housing part 16 is formed with a ring of ports 38 which may be closed by a disc 39 carried by a stem 40 which extends through a central port and is surrounded by a compression spring 41 which urges the stem and disc upward so that the disc 39 closes the ports 38 and so that a disc 42 provided at the top of the stem 41 closes the needle valve seating in the wall 26. The ports 38 lead through a small chamber 43 and a duct 44 into the pump 7.

In use when the pump 7 starts the discs 39 and 42 and the stem 41 are drawn downwards drawing air and cream simultaneously into the housing part 16 and thence into the pump through the chamber 43 and duct 44. The mixture is discharged by the pump through a spring loaded non-return valve 44 and hence through a duct 46 to the homogeniser 10.

As soon as the pump stops the spring 41 surrounding the stem 40 causes the discs 39 and 42 to move upwards to interrupt the flow.

The amount of air which can be drawn into the pump for mixing with the cream is controlled by setting the position of the needle 25 relatively to its seating by rotating the plug so that it screws into or out of the valve chamber until a predetermined angular setting of the indicia 29 is obtained, or until the characteristics of the product are as desired.

The filter disc 30 can be readily replaced by peeling the skirt 27 off the edge of the flange 21 and after a new disc has been fitted snapping the skirt back on again.

It will be appreciated that the cream entering the valve chamber through the duct 37 and ports 36 contacts the air which is sucked in in the part 16 upstream of the disc valve provided by the ports 38 and disc 39. It would be equally possible and less costly for the cream supplied to meet the air supply downstream of the disc valve, for example in a chamber equivalent to the chamber 43, but the illustrated arrangement in which the cream meets the air upstream of the disc valve is considered to be preferable. In the alternative case in which the cream meets the air downstream of the disc valve, the disc 42 may be unnecessary thus reducing costs.

A further possible modification is elimination of the ring of ports 38 provided that the central port through which the stem 40 is large enough to accommodate in the clearance between the stem 40 and the edge of the port the necessary flow of cream or cream and air.

The embodiments of the invention in which an exclusive property or privilege is claimed are defined as follows:

1. A machine for producing whipped cream and other stiff flowable aerated emulsion food products, the machine comprising a housing, a motor-driven pump in the housing and having an inlet and an outlet, an air intake operatively connected to the pump inlet, an unpressurized liquid product container, a suction tube leading from the container and operatively connected to the pump inlet, whereby in use liquid product and air are simultaneously drawn into the pump, apparatus connected to the pump outlet and defining a flow path along which the mixture of liquid product and air is pumped to a product discharge outlet, and the flow path including a static homogenizer for emulsifying the mixture; the improvement comprising wall means defining a chamber operatively connected to the air intake; valve means at the chamber and including a needle valve assembly at the air intake and including a plug which is adjustable to control the flow of air into the chamber; the plug having a head portion for adjusting the plug; the adjustable plug having a cylindrical peripheral wall which is received in a cylindrical part of the chamber and an annular groove in the peripheral wall; an O-ring mounted in the annular groove and sealing against the chamber; and the valve means also including a member which has a resiliently-urged closed position and which is opened by pump suction to allow air to be sucked in.

2. A machine as set forth in claim 1 wherein the adjustable plug has a needle part at its innermost end, and an air passage from atmosphere is formed through the plug to an outlet port inwardly of the O-ring and laterally of the needle.

3. A machine as set forth in claim 2 in which the adjustable plug is formed in two pieces including an outer piece which carries the head portion and an inner piece which carries the needle, a filter disc is located between the two pieces, means for holding the two pieces with the filter disc trapped between them, the outer piece having an air inlet from atmosphere to one side of the filter disc, and the inner piece having said air passage therein leading from the other side of the filter disc to the needle.

4. A machine as set forth in claim 3 in which one of the pieces is arranged to snap over the peripheral edge of the other piece to hold the two pieces of the adjustable plug together.

5. A machine as set forth in claim 4 in which the outer piece is a plastic molding and carries a scale for setting the adjustment of the plug, and has a depending skirt which has an internal groove for said snap fit; and the inner piece is formed of stainless steel.

6. A machine as set forth in claim 2 in which the chamber has a wall portion with an aperture spaced from the needle; and in which the member of the valve means which has a resiliently urged closed position and which is opened by pump suction to allow air to be sucked in includes a stem extending through the aperture in the chamber wall portion, a disc carried by the stem, and a spring surrounding the stem and which resiliently urges the disc into engagement with the wall to close the aperture downstream of the needle when the pump is not operating.

7. A machine as set forth in claim 6 wherein the suction tube is operatively connected to the chamber upstream of said chamber wall portion whereby the liquid product supply meets and mixes with the air supply immediately upstream of the aperture.

8. A machine as set forth in claim 7 in which the member also includes a portion carried by the stem and which closes off the air supply upstream of the point where the suction tube is connected to the chamber to prevent back-flow of liquid product into the air supply line when the pump is not operating.

9. A machine as set forth in claim 8 in which the chamber has a laterally-extending wall portion adjacent the needle and having an opening which cooperates with the needle to adjust the air flow as the plug is adjusted, and in which the portion carried by the stem includes a second disc which closes said opening from the side opposite the needle.

10. A machine for producing whipped cream and other stiff flowable aerated emulsion food products, the machine comprising a housing, a motor-driven pump in the housing and having an inlet and an outlet, an air intake operatively connected to the pump inlet, an unpressurized liquid product container, a suction tube leading from the container and operatively connected to the pump inlet, whereby in use liquid product and air are simultaneously drawn into the pump, apparatus connected to the pump outlet and defining a flow path along which the mixture of liquid product and air is pumped to a product discharge outlet, and the flow path including a static homogenizer for emulsifying the mixture; the improvement comprising wall means defining a chamber operatively connected to the air intake; valve means at the chamber and including a needle valve assembly at the air intake and including a plug which is adjustable to control the flow of air into the chamber; the plug being formed of two pieces including an outer piece and an inner piece; a filter disc positioned between the two pieces, fastening means for holding the two pieces of the plug together with the filter disc trapped between them; the outer piece having an air inlet from atmosphere to one side of the filter disc; the inner piece having an air passage from the other side of the filter disc to the chamber; the outer piece having a head portion disposed so that it is readily accessible for adjusting the plug; and the valve means also including a member which has a resiliently-urged closed position and which is opened by pump suction to allow air to be sucked in.

11. A machine as set forth in claim 10 wherein one of the pieces is arranged to snap over the peripheral edge of the other piece to provide said fastening means.

12. A machine as set forth in claim 11 wherein the outer piece is a plastic molding and has a depending skirt which has an internal groove for said snap fit; and the inner piece is formed of stainless steel.

13. A machine as set forth in claim 12 in which the outer piece carries a scale for setting the adjustment of the plug.

* * * * *

PO-1050
(5/69)

UNITED STATES PATENT OFFICE
CERTIFICATE OF CORRECTION

Patent No. 3,758,080　　　　　　　　Dated September 11, 1973

Inventor(s)　John MacManus

It is certified that error appears in the above-identified patent and that said Letters Patent are hereby corrected as shown below:

Page 1, under "Foreign Application Priority Data"
"April 29, 1971　Great Britain　12,000/71"
　　　　　　　should read　　-- 12,100/71 --.

Column 1, line 12, before "describes" insert
-- (U.S. Patent No. 3,606,266) --.

Column 3, line 4, before "Specification" insert
-- said British --;
　　　Line 8, before "provisional" insert -- British --;
　　　Line 9, before "although" insert
　　　　-- , Serial No. 12,100/71 --;
　　　Line 51, "10" should be -- 24 --.

Column 4, line 2, "44" should be -- 45 --.

Signed and sealed this 12th day of February 1974.

(SEAL)
Attest:

EDWARD M. FLETCHER, JR.　　　　　C. MARSHALL DANN
Attesting Officer　　　　　　　　Commissioner of Patents